United States Patent [19]

Ishii et al.

[11] Patent Number: 5,434,831
[45] Date of Patent: Jul. 18, 1995

[54] MAGNETO-OPTICAL RECORDING APPARATUS CAPABLE OF BOTH MAGNETIC MODULATION AND LIGHT MODULATION RECORDING

[75] Inventors: Kazuyoshi Ishii; Koyo Hasegawa, both of Tokyo, Japan

[73] Assignee: Canon Kabushiki Kaisha, Tokyo, Japan

[21] Appl. No.: 297,906

[22] Filed: Aug. 31, 1994

Related U.S. Application Data

[63] Continuation of Ser. No. 217,755, Mar. 25, 1994, abandoned, which is a continuation of Ser. No. 644,581, Jan. 23, 1991, abandoned.

[30] Foreign Application Priority Data

Jan. 23, 1990 [JP] Japan .................................. 2-13268
Mar. 16, 1990 [JP] Japan .................................. 2-66109

[51] Int. Cl.$^6$ ............................................. G11B 13/04
[52] U.S. Cl. .................................... 369/13; 360/114; 360/66; 360/59
[58] Field of Search ............... 369/13; 360/114, 59, 360/60, 66

[56] References Cited

U.S. PATENT DOCUMENTS

| | | |
|---|---|---|
| 4,610,009 | 9/1986 | Connell .................................. 360/114 |
| 4,910,622 | 3/1990 | Saito et al. ............................ 360/131 |
| 4,959,820 | 9/1990 | Horimai et al. ........................ 369/13 |
| 5,043,960 | 8/1991 | Nakao et al. .......................... 360/114 |
| 5,202,863 | 4/1993 | Miyatake et al. ...................... 369/13 |
| 5,278,809 | 1/1994 | Ogata ..................................... 369/13 |

FOREIGN PATENT DOCUMENTS

| | | |
|---|---|---|
| 0126596 | 11/1984 | European Pat. Off. . |
| 0271342 | 6/1988 | European Pat. Off. . |
| 59-215008 | 12/1984 | Japan . |
| 62-110646 | 5/1987 | Japan .................................. 360/114 |
| 1-155538 | 6/1989 | Japan . |
| 1-173408 | 7/1989 | Japan .................................. 369/13 |
| 4-162238 | 6/1992 | Japan .................................. 369/13 |

OTHER PUBLICATIONS

Patent Abstracts of Japan, Kokai No. 63-86130, vol. 12, No. 323, Sep. 1988.
Nakao et al., "High Speed Overwritable Magneto-Optic Recording," Japanese Journal of Applied Physics, vol. 26, (1987), Supplement 26-4.

*Primary Examiner*—Hoa T. Nguyen
*Attorney, Agent, or Firm*—Fitzpatrick, Cella, Harper & Scinto

[57] ABSTRACT

Disclosed is a magneto-optical recording apparatus for recording an information signal on or for erasing an information signal from magneto-optical recording media by irradiating the magneto-optical recording media with a beam of light while applying a magnetic field thereto. The magneto-optical recording apparatus includes, as a magnetic field application device, a composite magnetic head which includes a first magnetic head capable of modulating a generated magnetic field in accordance with an information signal, and a second magnetic head capable of generating a constant magnetic field which is not associated with the information signal and capable of switching the direction of the constant magnetic field. This provides a magneto-optical recording apparatus which can use magneto-optical recording media for both light modulation type recording and magnetic field modulation type recording, and which ensures overwriting without increasing the overall size of the apparatus.

44 Claims, 10 Drawing Sheets

MAGNETO-OPTICAL RECORDING APPARATUS CAPABLE OF BOTH MAGNETIC MODULATION AND LIGHT MODULATION RECORDING

This application is a continuation of prior application, Ser. No. 08/217,755 filed Mar. 25, 1994, which application is a continuation of prior application, Ser. No. 07/644,581 filed Jan. 23, 1991, both now abandoned.

BACKGROUND OF THE INVENTION

1. Field of the Invention

The present invention relates to a magneto-optical recording apparatus which is capable of both magnetic modulation type, and light modulation type, recording.

2. Description of the Related Art

Various magneto-optical recording apparatus of the light modulation type are known and available on the market. This type of magneto-optical recording apparatus performs recording of an information signal on a magneto-optical recording medium, such as a disk, by the irradiation of a portion of the magneto-optical disk with a light beam whose intensity has been modulated in accordance with the information signal and by the application of an external magnetic field to the portion the magneto-optical disk which is being irradiated with the light. FIG. 1 illustrates the recording principle of such a light modulation type recording apparatus. It is assumed that a magnetic film 100b of a magneto-optical disk 100 is initialized in a downwardly magnetized state. A laser light source 101 generates a beam of light for recording information. On and off of the laser light source 101 is controlled based on an information signal input to a drive circuit 102. Drive circuit 102 drives the laser light source 101. The laser beam is condensed onto the magnetic film 100b by means of an optical system 103. Once the laser beam is irradiated onto the magnetic film, the temperature of the portion (a spot) of the magnetic film 100b which is irradiated with the laser beam rises to the Curie point, or to a temperature above which magnetization of the film can be readily reversed. A bias magnet 104 generates a constant magnetic field B on the surface of the disk when supplied with a direct constant current by means of a constant current source 105. Hence, only the portion of the magnetic film 100b which is irradiated with the laser beam is magnetized in a direction opposite to the initialized direction, i.e., in an upward direction. The magnetized state of that portion is preserved by the passage of that portion through the laser beam irradiation position and by the resultant decrease in the temperature thereof. Information signals are recorded on the magnetic film 100b in a pattern of magnetized areas, each of which has substantially the same size as that of the laser spot (about 1 μm), by turning on and off the laser beam. In FIG. 1, reference numerals 100a and 100c respectively denote a protective film for protecting the magnetic film 100b and a glass or plastic substrate. However, the protective film 100a of the disks presently available on the market is not designed to withstand any impact. Therefore, such disks are not suitably used with magnetic field modulation type recording devices, discussed herein.

The information signals recorded on the magneto-optical disk are reproduced by utilizing the interaction between the light and magnetic force, (known as the magnetic Kerr effect) that is, by irradiating the magnetic film with a laser beam having a fixed intensity and then by detecting rotation of the polarization plane of the laser beam reflected by the magnetic film.

The magnetic Kerr effect is a phenomenon in which the plane of polarization of a linearly polarized laser beam, which is reflected by a film magnetized in a direction perpendicular to the direction of propagation of the laser beam, rotates in either clockwise or counterclockwise direction, depending on the direction of the magnetization. for reproduction of an information signal, this rotation is converted into light intensity by means of an analyzer.

When the information signal recorded in this type of recording medium is to be replaced with another one, the magnetic film 100b is uniformly magnetized in a downward direction by reversing the direction of the magnetic field generated by the bias magnet 104 (by making it downward) and by continuously irradiating the magnetic film with a non-modulated laser beam to erase the previously written information signal. Thereafter, a new information signal is recorded using the above-described procedure.

In other words, in the light modulation type recording apparatus now available on the market, it is impossible to write an information signal directly on another information signal already recorded on the disk.

Recently, a magnetic field modulation type recording apparatus, in which an information signal can be written directly on another information signal, has been proposed in, for example, the Japanese Journal of Applied Physics, Vol. 26 (1987) Supplement 26-4, "High Speed Overwritable Magneto-Optic Recording." FIG. 2 illustrates the recording principle of this type of recording apparatus. In FIG. 2, similar components to those in FIG. 1 are indicated by like reference numerals. A laser light source 101 is supplied with a d.c. current by a constant current source 106 to continuously emit a laser beam which is condensed onto magnetic film 100b by means of optical system 103. The temperature of the portion (spot) of the magnetic film which is irradiated with the laser beam rises to the Curie temperature, or to a temperature above which the direction of the magnetization can be readily reversed. A magnetic head 108 provided on a floating type slider 117 is held at a position 10 μm or less above the surface of the disk 100 during recording. To prevent damage to the magnetic film 100b caused by contact of the floating slider 117 with the surface of the disk, or by dust disposed between the slider and the surface of the disk, a special protective film 100a, in which a filler or the like is present is formed on the magnetic film 100b. Because of this special protective film, the disks employed in such a magnetic field modulation type recording apparatus exhibit better durability than those employed in the light modulation type recording apparatus. The magnetic head 108 is driven by a magnetic head drive circuit 109 to generate a magnetic field whose direction is reversed in accordance with an input information signal. Recording of the information signal at a high speed requires the provision of a small magnetic head very close to the disk. Hence, the provision of the magnetic head on the floating type slider is desired in the magnetic field modulation type recording apparatus, unlike in the light modulation type recording apparatus.

Only the portion of the magnetic film 100b which is irradiated with the laser beam is heated and magnetized in the same direction as the direction of the magnetic field generated by the magnetic head 108. The temperature of that portion rapidly decreases after the rotation of the disk causes that portion to pass through the laser beam irradiation position, by which magnetization thereof is preserved. Information signals are recorded on the magnetic film 100b in a pattern of magnetized areas, each of which has substantially the same size as that of the laser spot (about 1 μm), by reversing the magnetic field generated by the magnetic head. In the magnetic field modulation type recording apparatus, it is not necessary to make uniform the direction in which the magnetic film is magnetized, i.e., to perform an erasure operation, when the information signal recorded on the disk is replaced with new a one. Rather, it is possible to write an information signal directly over an already recorded information signal a desired number of times by repeating the above-described operation. Reproduction of an information signal is performed in exactly the same manner as in the light modulation type recording apparatus.

Thus, the light modulation type magneto-optical recording apparatus, which is not capable of writing an information signal directly over another information signal, which is available on the market, and the magnetic field modulation type magneto-optical recording apparatus, which has been proposed to write an information signal directly over an already recorded information signal, differ from each other in the protective film of the disks used as the magneto-optical recording media, and in the configuration of the magnetic field application means. Thus, the two are not at all compatible with each other. In particular, the effective range of the magnetic field generated by the magnetic field modulation type magnetic head is as small as 0.2 mm in diameter, and a positioning accuracy of approximately 0.05 mm is thus required between the magnetic field and the laser beam spot formed on the disk. In a case when a large light modulation type bias magnet and a small magnetic field modulation type magnetic head are separately provided on the same recording apparatus, the position of both the bias magnet and the magnetic head is mechanically switched over by a moving mechanism that is large and whose size increases, depending on the type of disk employed. However, a moving mechanism that is not large as to move the bias magnet and the magnetic head on a horizontal plane relative to the surface of the disk cannot assure the required positioning accuracy of 0.05 mm between the laser spot and the magnetic field modulation type magnetic head. Furthermore, the provision of the light modulation type bias magnet and the magnetic field modulation type magnetic head as separate components increases the overall size of the apparatus.

SUMMARY OF THE INVENTION

An object of the present invention is to provide a magneto-optical recording apparatus which can employ both magneto-optical recording media for use both in the light modulation type recording and for use in the magnetic field modulation type recording, which also permits overwriting of information without increasing the size of the apparatus.

To achieve the above object, the present invention provides a magneto-optical recording apparatus for recording an information signal on, and for erasing an information signal from, a magneto-optical recording medium by applying a magnetic field thereto by a magnetic field application means, while irradiating the recording medium with a beam of light. The magnetic field application means comprises a composite magnetic head which includes a first magnetic head capable of modulating a magnetic field generated by the head in accordance with an information signal, and a second magnetic head capable of (1) generating a constant magnetic field, regardless of the content of the information signal, and (2) switching over the direction of the constant magnetic field.

The present invention also provides a magneto-optical recording apparatus that includes an optical head and a magnetic head. The optical head irradiates a magneto-optical recording medium with a beam of light. The magnetic head applies a magnetic field to the magneto-optical recording medium concurrently with the beam of light to record information on the recording medium. The magnetic head includes a first magnetic head for generating a magnetic field and for modulating the generated magnetic field and a second magnetic head for generating a constant magnetic field and for switching a directin of the constant magnetic field. The first and second magnetic heads are arranged as one unit. The magnetic field generated by the first magnetic head can be modulated in accordance with an information signal and the constant magnetic field generated by the second magnetic head can be independent of the information signal.

The present invention also provides a magneto-optical recording apparatus that includes an optical head, a first magnetic head, and a second magnetic head. The optical head irradiates a magneto-optical recording medium with a beam of light concurrently with at least one of first and second magnetic fields to record information on the recording medium. The first magnetic head applies a first magnetic field to the magneto-optical recording medium. The first magnetic head includes means for generating a magnetic field and for modulating the generated magnetic field, means for generating a constant magnetic field, and means for switching a direction of the constant magnetic field. The second magnetic head applies a second magnetic field to the magneto-optical recording medium. The second magnetic head includes means for generating a constant magnetic field and means for switching a direction of the constant magnetic field. The first magnetic head can generate a magnetic field and modulate the generated magnetic field in accordance with an information signal, and the constant magnetic field generated by the first magnetic head can be independent of the information signal. The constant magnetic field generated by the second magnetic head can also be independent of the information signal.

The present invention also provide a magnetic head for generating a magnetic field and for applying the magnetic field to magneto-optical recording media to record information thereon. The magnetic head includes first and second magnetic heads. The first magnetic head modulates the generated magnetic field. The second magnetic head generates a constant magnetic field and switches a direction of the constant magnetic field. The second magnetic head is integrally arranged with the first magnetic head.

The present invention also provides a magnetic head for generating a magnetic field and for applying the magnetic field to magneto-optical recording media to record information thereon. The magnetic head includes first and second magnetic heads. The first magnetic head modulates the generated magnetic field, generates a constant magnetic field, and switches a direction of the constant magnetic field. The second magnetic head generates a constant magnetic field and switches a direction of the constant magnetic field.

DETAILED DESCRIPTION OF THE PREFERRED EMBODIMENTS

An embodiment of the present invention will be described below with reference to FIGS. 3 (A) through 5 (D).

Figure 1:
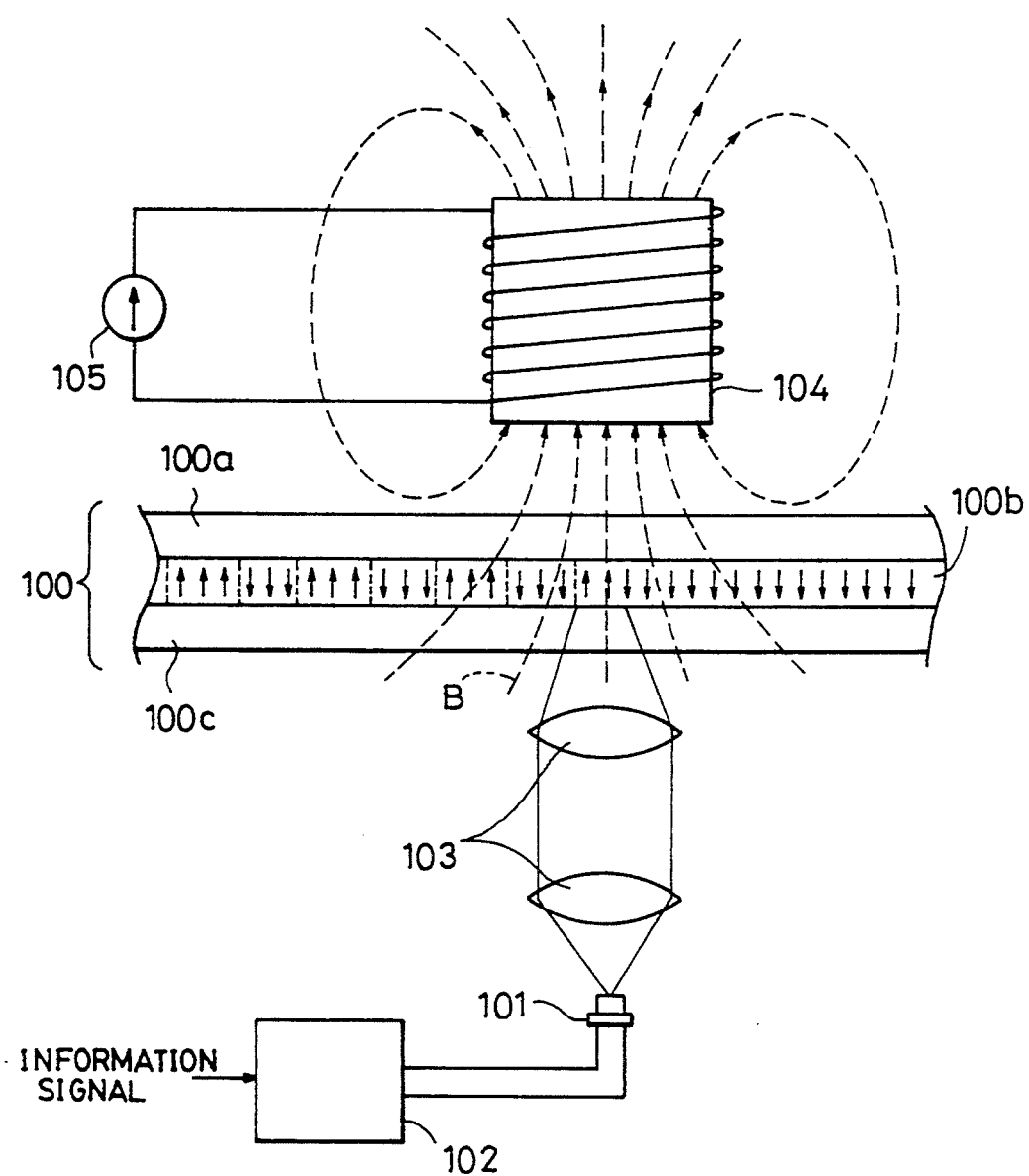
FIG. 1 shows a conventional light modulation type recording apparatus.
Figure 2:
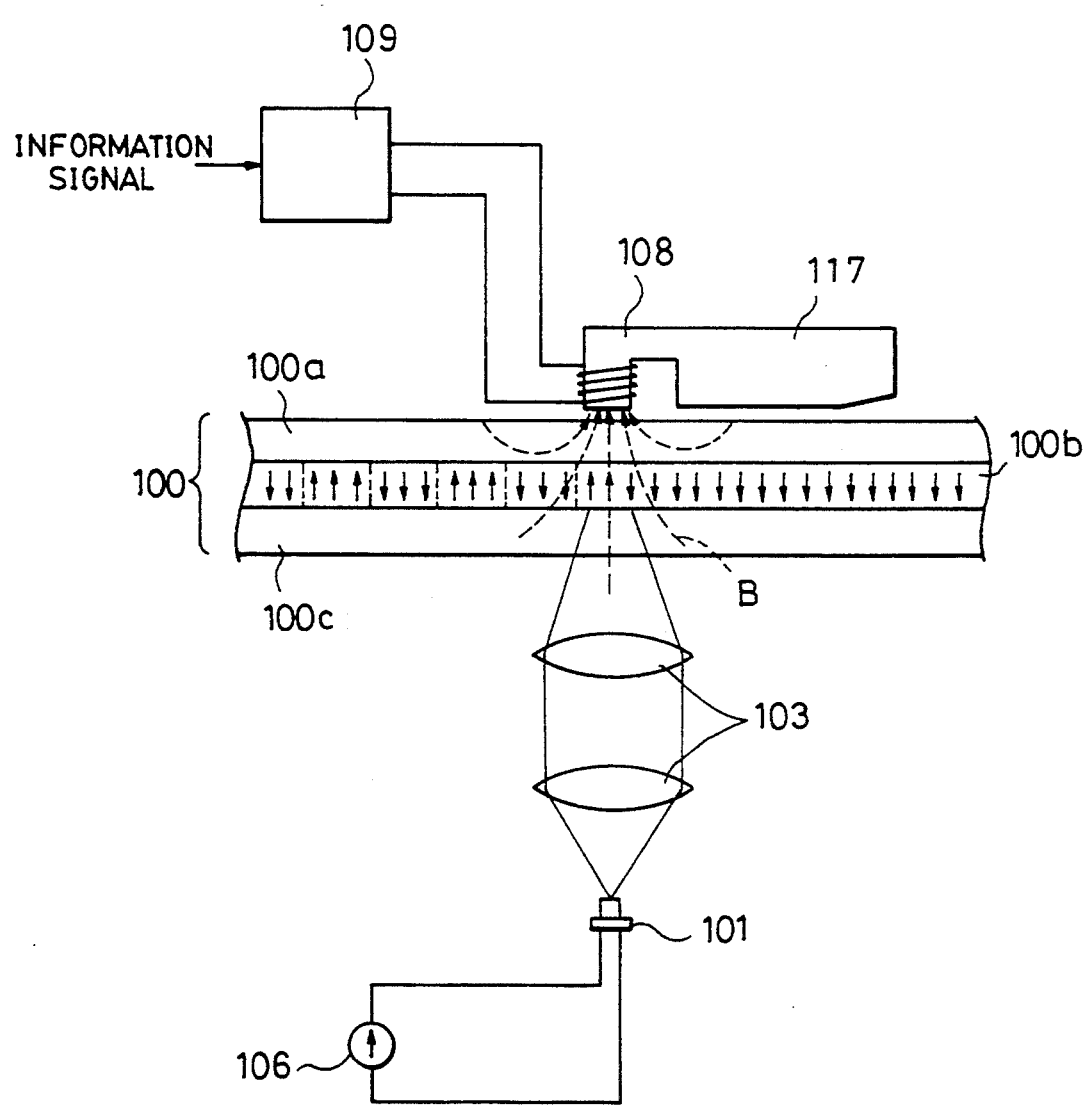
FIG. 2 shows a conventional magnetic field modulation type recording apparatus.
Figure 3A:
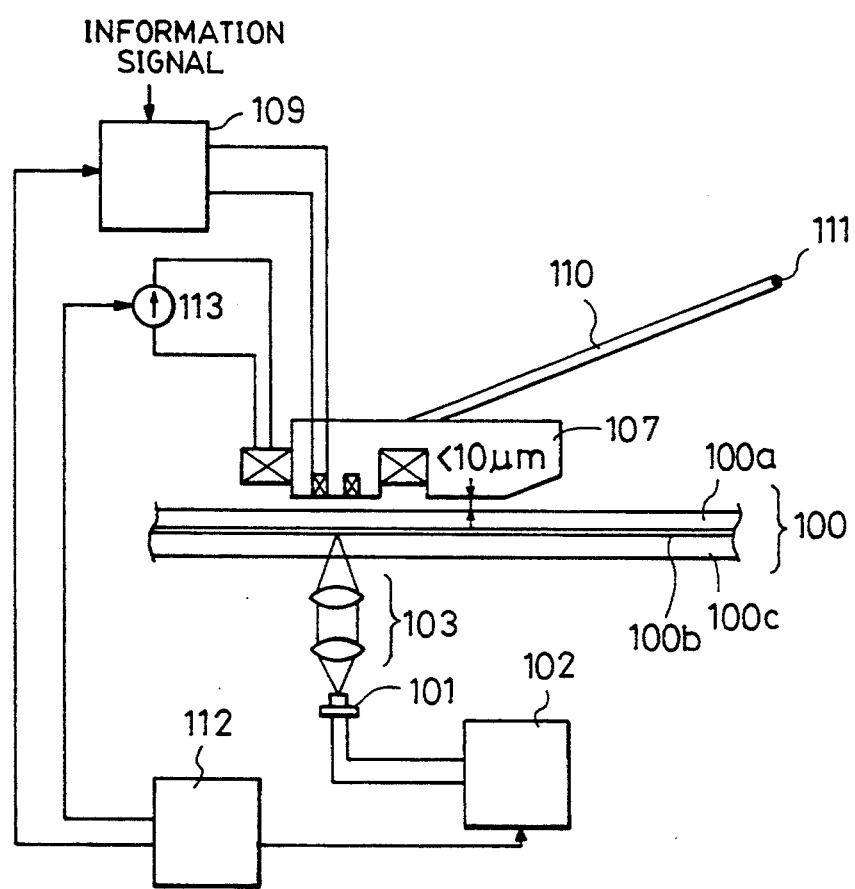
FIGS. 3 (A) and 3 (B) show the configuration and operation of a first embodiment of a magneto-optical recording apparatus according to the present invention.
Figure 3:
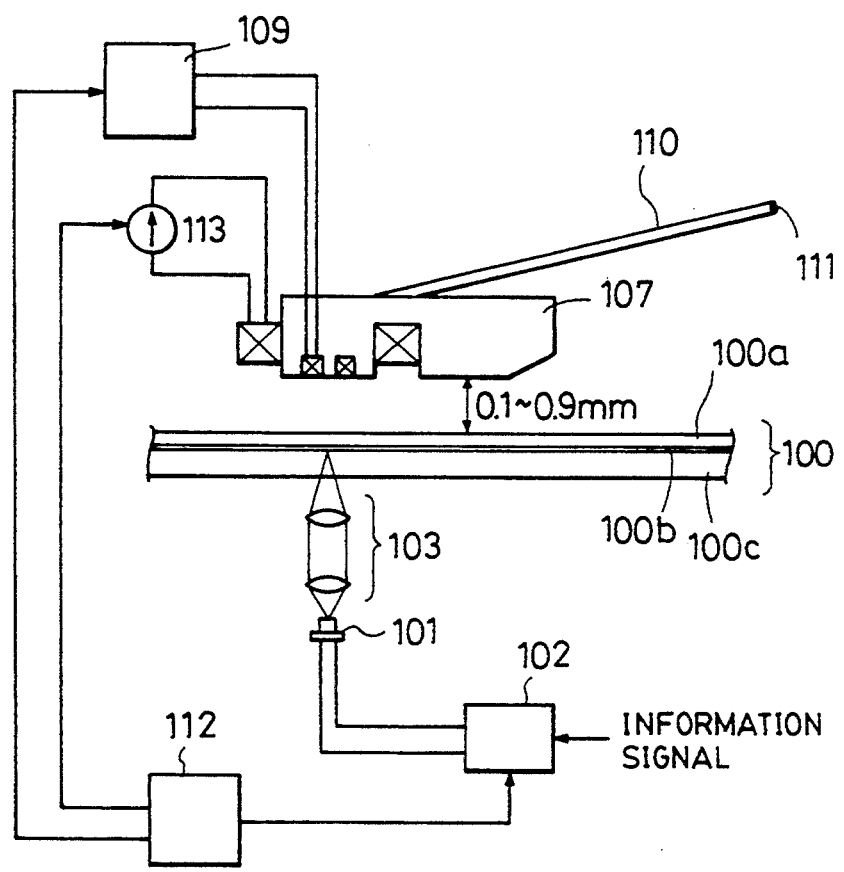

FIGS. 3 (A) and 3 (B) show the configuration and operation of a magneto-optical recording apparatus according to the present invention. In FIGS. 3 (A) and 3 (B), an information signal is supplied to the magneto-optical recording apparatus from one of a memory incorporated in the magneto-optical recording apparatus, a control unit of an external apparatus connected to the magneto-optical recording apparatus, or a memory or the like incorporated in an apparatus which contains the magneto-optical recording apparatus. Composite magnetic heads provided on a floating type slider 107 are utilized to record the information on recording medium 100.

Figure 5:
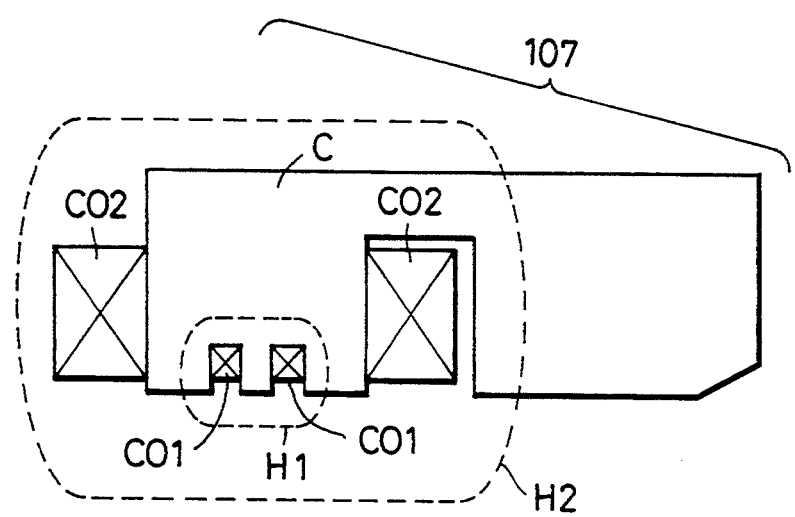
FIGS. 5 (A), 5 (B), 5 (C) and 5 (D) shows various magnetic heads according to the present invention.
Figure 5:
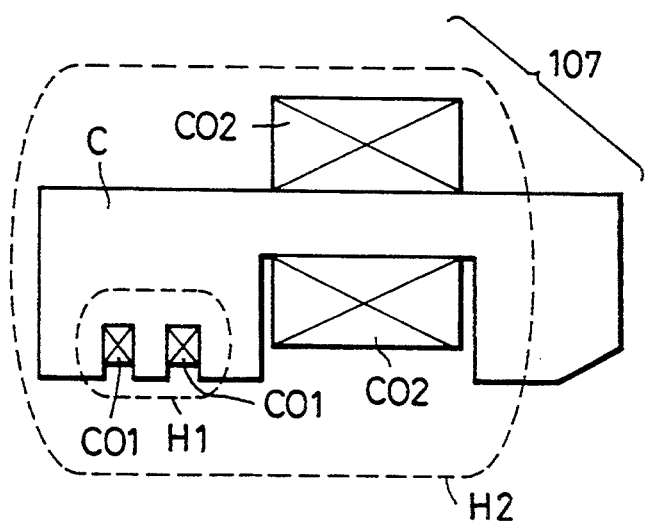
Figure 5:
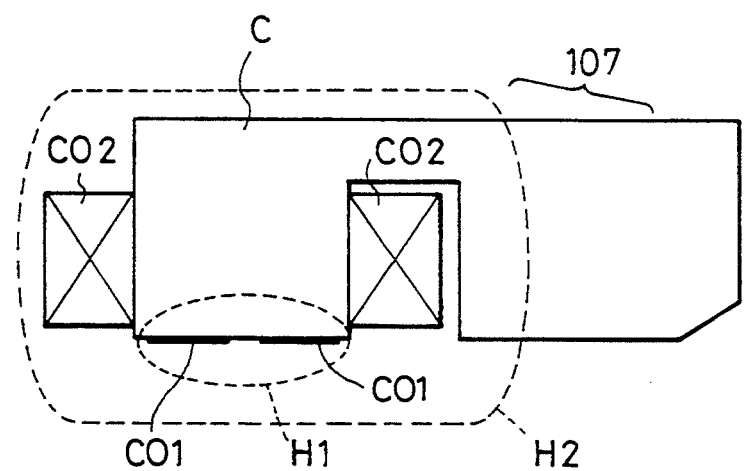
Figure 5:
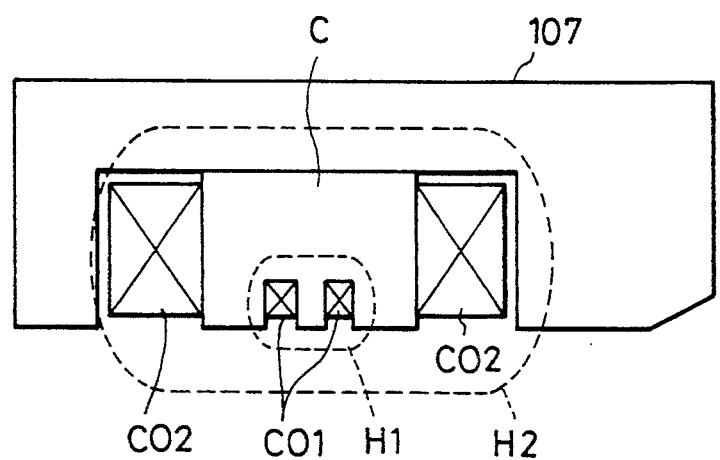

FIGS. 5 (A) to 5 (D) are cross-sectional views of various types of floating type sliders 107 of the present invention, each slider having magnetic heads provided thereon. The magnetic heads shown in FIGS. 5 (A) and 5 (B) each form a composite magnetic head which includes a first magnetic head H1 capable of modulating the magnetic field generated by the head in accordance with an information signal, and a second magnetic head H2 capable of generating a constant magnetic field regardless of the content of the information signal and capable of switching over the direction of the constant magnetic field. The composite magnetic head is thus provided on the floating type slider 107. The composite magnetic head includes a core C made of a soft magnetic material such as ferrite and coils CO1 and CO2 wound around the core C. The coil CO1 constitutes the magnetic head H1 while the coil CO2 forms the magnetic head H2. FIG. 5 (C) shows an example of a composite magnetic head whose coil CO1 formed on the magnetic pole end surface of the core C has a thin film configuration.

FIGS. 5 (A) to 5 (C) show an example of a composite magnetic head in which the core C made of the soft magnetic material and the floating type slider 107 are formed as one unit, while FIG. 5 (D) shows an example of a composite magnetic head which is adhered to a floating type slider 107 made of ceramic or the like.

As shown in FIGS. 3 (A) and 3 (B), the floating type slider 107, on which the composite magnetic head is provided, is disposed on the side of a magneto-optical disk 100 which serves as the magneto-optical recording medium, which is opposite to the side on which the laser light source 101 and the optical system 103 are disposed. The slider 107 is supported by an arm 110 which pivots about a support 111. The floating type slider 107 can move in a direction perpendicular to the surface of the disk 100. The floating type sliders 107 having a composite magnetic head provided thereon, of the type shown in FIGS. 3 (A) and 3 (B), have the configuration shown in FIG. 5 (A).

Thus, the first and second magnetic heads H1 and H2 are provided on the same floating slider 107. Also, the floating slider 107 having the composite magnetic head provided thereon can move in a direction perpendicular to the surface of the disk by means of the above-described elevation mechanism, but cannot move in a direction horizontal to the surface of the disk. In this way, a shift in the position between the magnetic head and the laser spot, which otherwise would be caused by the movement of the floating type slider 107, is prevented. This is important, because shifts in the position of the magnetic head in the direction horizontal to the surface of the disk relative to the laser spot significantly hinder the quality of recording on the recording medium.

The operation of the magneto-optical recording apparatus according to the present invention will now be described. First, the operation of recording an information signal by the magnetic field modulation type magnetic head will be described with reference to FIG. 3 (A). A protective film 100a exhibiting excellent durability is formed on the surface of the disk 100 so that the disk can withstand the magnetic field modulation type recording. During recording, the floating type slider 107 is lowered to the surface of the disk 100 by means of the elevation mechanism with a load ranging from 5g to 10g applied to the slider. However, a buoyant force, caused by a stream of air generated when the disk 100 rotates at a high speed, holds the slider 107 at a position 10 $\mu$m or less above the surface of the disk 100.

The laser light source driving circuit 102 receives the control signal from the control circuit 112 and thereby supplies a constant direct current to the laser light source 101 so that the laser light source continuously emits light at a fixed intensity. The laser beam emitted from the laser light source 101 is condensed onto the magnetic film 100b of the disk 100 by means of the optical system 103. The magnetic head drive circuit 109 receives the control signal from the control circuit and thereby supplies the current modulated using the information signal to the coil CO1 of the magnetic head H1 for use during the magnetic field modulation type recording to generate a magnetic field whose polarity changes in accordance with the information signal.

Figure 4:
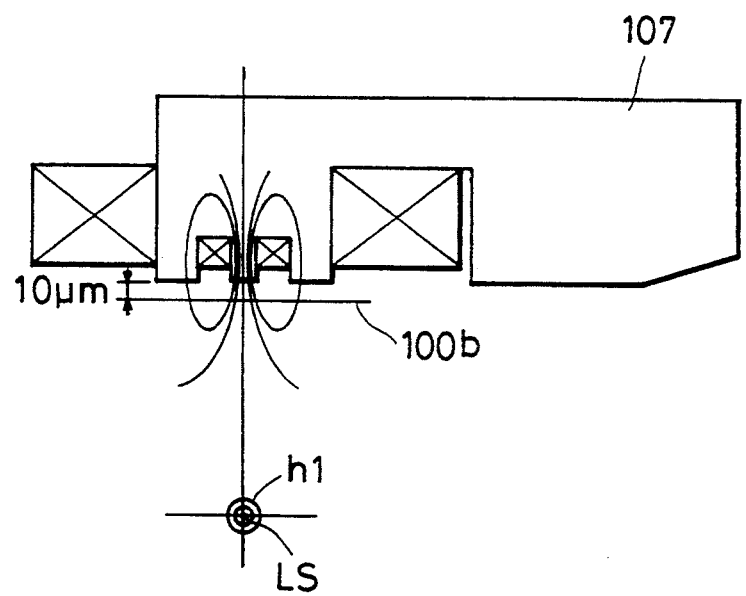
FIGS. 4 (A) and 4 (B) show the generation of a magnetic field by the magnetic heads shown in FIGS. 3 (A) and 3 (B).
Figure 4:
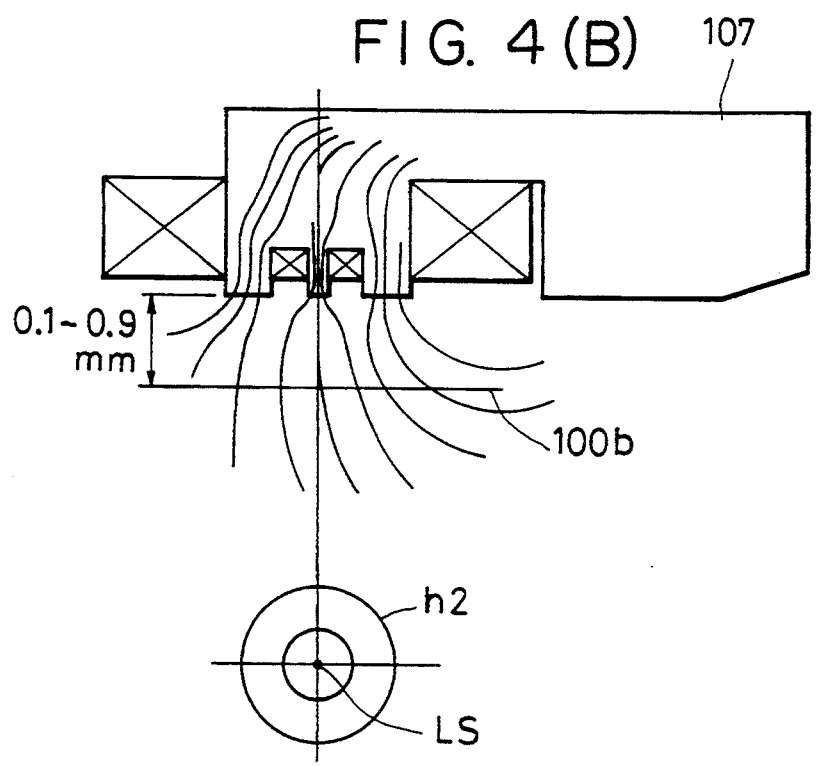

FIG. 4 (A) shows generation of the the magnetic field when the coil is modulated by the magnetic head drive circuit. The equimagnetic field curves on the plane of the magnetic film 100b are concentric, as indicated by h1 in FIG. 4 (A). The intensity of the magnetic field is the highest at the center of the concentric circles. A laser beam spot LS, adjusted beforehand, is then concurrently applied to the disk such that the center thereof substantially coincides with the center of the distribution of the magnetic field, to achieve effective recording. The constant current source 113 receives the control signal from the control circuit 112 and thereby supplies no current to the magnetic head H2 for use in the light modulation type recording. Hence, no magnetic field is generated by the magnetic head H2. Thus, recording of the information signal is performed based on the same principle as in the conventional magnetic field modulation type recording. In this magnetic field modulation type recording apparatus, overwriting of an information signal on the disk is easy, as stated above.

Next, the operation of recording an information signal during the light modulation type recording will be described with reference to FIG. 3 (B). Since the protective film 100a of the disk 100 employed in the light modulation type recording apparatus which is available on the market is neither durable nor reliable enough to withstand floating contact of the floating type slider 107, the slider is raised to and held at a position of 0.1 to 0.9 mm above the surface of the disk 100 during recording. The laser light source driving circuit 102 receives the control signal from the control circuit 112 and thereby supplies current to the laser light source 101 such that the laser light source 101 emits light on and off in accordance with the information signal. The laser beam emitted by the laser light source is condensed onto the magnetic film 100b of the disk 100 by means of the optical system 103.

The magnetic head drive circuit 109 receives the control signal from the control circuit 112 and thereby supplies no current to the coil CO1 of the magnetic head H1. Hence, no magnetic field is generated by the magnetic head H1. The constant current source 113 receives the control signal from the control circuit 112 and thereby supplies a constant direct current to the magnetic head H2 to generate a constant magnetic field by means of the magnetic head H2.

FIG. 4 (B) shows generation of the the magnetic field during such recording. The equimagnetic field curves h2 on the plane of the magnetic film 100b are concentric, like the equimagnetic field curves h1 of the magnetic field generated by the magnetic head H1 for use during the magnetic field modulation type recording shown in FIG. 4 (A), and are located in the same manner as the equimagnetic field curves h1. That is, the center of the magnetic field generated by the magnetic head is made to substantially coincide with the center of the laser beam spot LS to achieve efficient recording.

Thus, recording of an information signal is performed based on the same principle as in the above-described conventional light modulation type recording. As stated above, overwriting of an information signal is difficult in this light modulation type recording. However, light modulation type recording enables the use of light modulation type magneto-optical disks which are presently available on the market.

Thus, the magneto-optical recording apparatus according to the present invention has a composite magnetic head in which the first magnetic head, for use in the magnetic field modulation type recording, and the second magnetic head, for use in the light modulation type recording, are formed as one unit.

The composite magnetic head is provided on the floating type slider. The magneto-optical recording apparatus includes a function to move the floating type slider in a direction perpendicular to the surface of the magneto-optical recording medium so as to lower the floating type slider to a position where it floats above the surface of the magneto-optical recording medium during the magnetic field modulation type recording for the application of a magnetic field by the first magnetic head, and a function to raise the floating type slider from the position at which the slider is located for the magnetic field modulation type recording and hold it separately from the surface of the magneto-optical recording medium during the light modulation type recording for the application of a magnetic field by the second magnetic head.

Distribution of the intensity of the magnetic field generated by the first magnetic head over the magneto-optical recording medium is made to substantially coincide with distribution of the intensity of the magnetic field generated by the second magnetic head in a concentric fashion. The laser spot is adjusted on the magneto-optical recording medium beforehand with an accuracy of about 0.05 mm such that the center thereof substantially coincides with the center of the distribution of the magnetic fields generated by the first and second magnetic heads. Consequently, the two types of magnetic heads can be incorporated in one apparatus, without the provision of a large moving mechanism which deteriorates the relative positioning accuracy between the first and second magnetic heads and the laser spot (relative positioning accuracy on the plane of the surface of the recording medium). This enables the provision of a simple magneto-optical recording apparatus which is capable of conventional light modulation type recording and magnetic field modulation type recording in which overwriting of an information signal is possible.

As will be understood from the foregoing description, the magneto-optical recording apparatus according to the present invention has a composite magnetic head in which the first magnetic head, for use in the magnetic field modulation type recording and the second magnetic head, for use in the light modulation type recording, are formed as one unit. Since distribution of the intensity of the magnetic field generated by the first magnetic head is made to coincide with distribution of the intensity of the magnetic field generated by the second magnetic head in a concentric fashion on the magnetic film of the magneto-optical recording medium, a recording mode can be switched over between the magnetic modulation type recording and the light modulation type recording by raising or lowering the composite magnetic head in a direction perpendicular to the surface of the magneto-optical recording medium by 1 mm or less. The effective range of the magnetic field (the size of the magnetic field required for recording) generated by the first magnetic head for use in the magnetic field modulation type recording is 0.2 mm in diameter, and positioning is performed between the magnetic head and the laser beam spot beforehand with an accuracy of about 0.05 mm such that the laser beam spot can be located within that range. However, the above-described raising and lowering operations of the composite magnetic head by about 1 mm do not deteriorate the above-described accuracy, but permit reduction in the overall size of the apparatus.

This enables the provision of a small magneto-optical recording apparatus which is capable of both conventional light modulation type recording and magnetic field modulation type recording in which overwriting of an information signal is possible.

Another embodiment of the present invention will be described below with reference to FIGS. 6(A) and 6(B).

Figure 6:
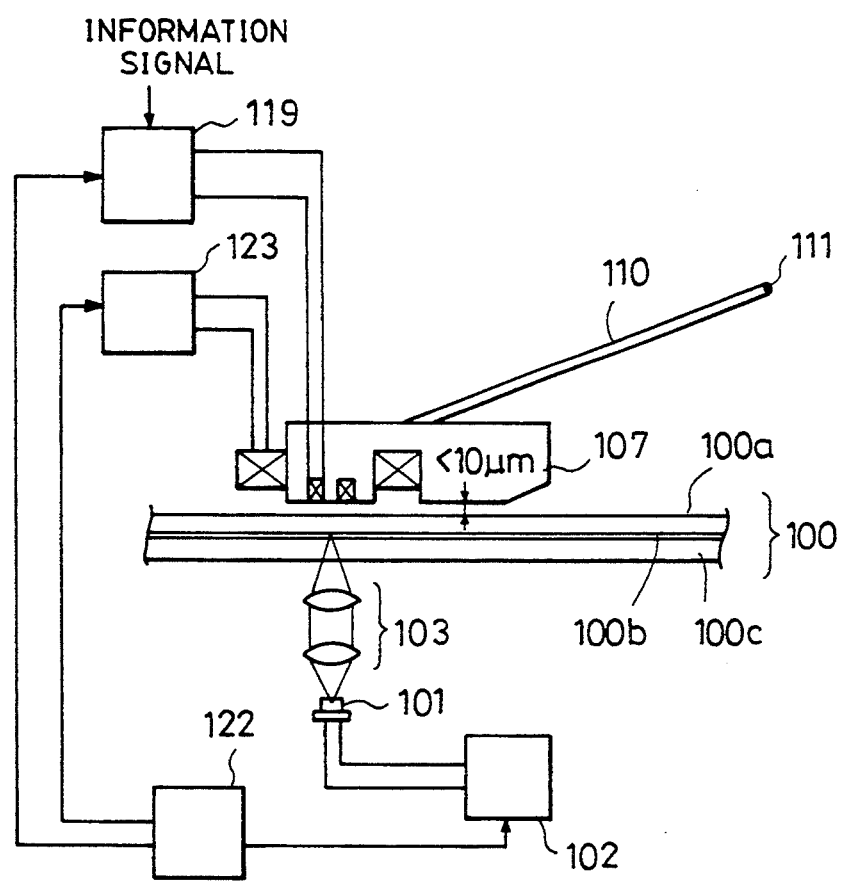
FIGS. 6 (A) and 6 (B) show the configuration and operation of a second embodiment of the magneto-optical recording apparatus according to the present invention.
Figure 6B:
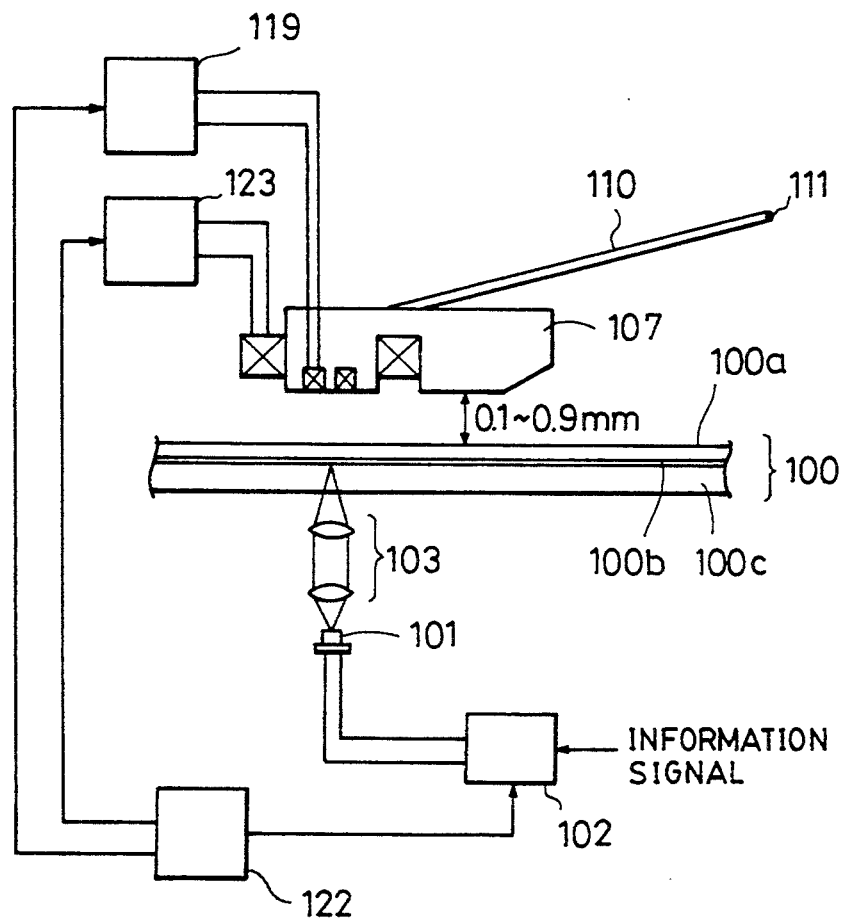

FIGS. 6 (A) and 6 (B) show the configuration and operation of a magneto-optical recording apparatus according to the present invention. The basic configuration of the magneto-optical recording apparatuses shown in FIGS. 6 (A) and 6 (B) is the same as that of the apparatuses shown in FIGS. 3 (A) and 3 (B). The floating type slider 107 with the composite magnetic head provided thereon has basically the same configuration as that of the composite magnetic head shown in FIG. 5 (A). In each slider, the composite magnetic head includes a first magnetic head H1 which is capable of modulating the magnetic field generated by the head in accordance with an information signal and capable of generation of a constant magnetic field which is not associated with the information signal, and a second magnetic head H2 which is capable of generating a constant magnetic field, regardless of the content of the information signal. The composite magnetic head is provided on the floating type slider 107. The composite magnetic head includes a core C made of a soft magnetic material such as ferrite and coils CO1 and CO2 wound around the core C. The coil CO1 constitutes the magnetic head H1 while the coil CO2 forms the magnetic head H2.

As shown in FIGS. 6 (A) and 6 (B), the floating type slider 107 on which the composite magnetic head is provided is disposed on a side of the magneto-optical disk 100, which serves as the magneto-optical recording medium, which is opposite to the disk on which the laser light source 101 and the optical system 103 are disposed. The slider 107 is supported by the arm 110 which pivots about the support 111. The floating type slider 107 can move in a direction perpendicular to the surface of the disk 100. The floating type sliders 107 having the composite magnetic head provided thereon, such as shown in FIGS. 6 (A) and 6 (B), have a configuration such as shown in FIG. 5 (A).

Thus, the first and second magnetic heads H1 and H2 are provided on the same floating slider 107. Also, the floating slider 107 having the composite magnetic head provided thereon can move in a direction perpendicular to the surface of the disk by means of the above-described elevation mechanism.

The operation of the magneto-optical recording apparatus according to the present invention will now be described. First, the operation of recording an information signal by the magnetic field modulation type magnetic head will be described with reference to FIG. 6 (A). Protective film 100a, exhibiting excellent durability, is formed on the surface of the disk 100 so that the disk can withstand the magnetic field modulation type recording. During recording, the floating type slider 107 is lowered to the surface of the disk 100 by the elevation mechanism with a load ranging from 5g to 10g applied to the slider. However, a buoyant force, caused by a stream of air generated when the disk 100 rotates at a high speed, holds the slider 107 at a position 10 μm or less above the surface of the disk 100.

The laser light source driving circuit 102 receives the control signal from a control circuit 122 and thereby supplies a constant direct current to the laser light source 101 so that the laser light source 101 continuously emits light at a fixed intensity. The laser beam emitted from the laser light source 101 is condensed onto the magnetic film 100b of the disk 100 by means of the optical system 103. A magnetic head H1 drive circuit 119 receives the control signal from the control circuit 122 and thereby supplies the current modulated using the information signal to the coil CO1 of the magnetic head H1 for use during the magnetic field modulation type recording to generate a magnetic field whose polarity changes in accordance with the information signal. The magnetic head H2 drive circuit 123 receives the control signal from the control circuit 122 and thereby supplies no current to the magnetic head H2 for use during the light modulation type recording. Hence, no magnetic field is generated by the magnetic head H2. Thus, recording of the information signal is performed based on the same principle as in the conventional magnetic field modulation type recording. In this magnetic field modulation type recording, overwriting of the information signal on the disk is easy, as stated above.

Next, the operation of recording an information signal during the light modulation type recording will be described with reference to FIG. 6 (B). Since the protective film 100a of the disk 100 employed in the light modulation type recording apparatus which is available on the market is neither durable nor reliable enough to withstand floating contact of the floating type slider 107, the slider is raised to and held at a position 0.1 to 0.9 mm above the surface of the disk 100 during recording by means of the above-described elevation mechanism. The laser light source driving circuit 102 receives the control signal from the control circuit 122 and thereby supplies current to the laser light source 101 such that the laser light source 101 emits light on and off in accordance with the information signal. The laser beam emitted by the laser light source is condensed onto the magnetic film 100b of the disk 100 by means of the optical system 103.

The magnetic head H1 drive circuit 119 receives the control signal from the control circuit 122 and thereby supplies current to the coil CO1 of the magnetic head H1. Hence, the magnetic head H1 generates a constant magnetic field. A magnetic head H2 drive circuit 123 receives the control signal from the control circuit 122 and thereby supplies a constant direct current to the magnetic head H2 to generate a constant magnetic field by means of the magnetic head H2.

The direction of the magnetic fields generated by the magnetic heads H1 and H2 in FIG. 4 (B) is the same relative to the disk 100, so that the sum of magnetic fields generated by the magnetic heads H1 and H2 is applied to the disk 100. Thus, both the magnetic fields generated by the magnetic heads H2 and H1 are utilized to provide a sufficiently strong magnetic field. The direction of the constant magnetic fields generated by the magnetic heads H1 and H2 can be changed.

In the magneto-optical recording apparatus shown in FIGS. 6 (A) and 6 (B), distribution of the intensity of the magnetic field generated by the first magnetic head over the magneto-optical recording medium is made to substantially coincide with distribution of the intensity of the magnetic field generated by the second magnetic head in a concentric fashion. The laser spot is adjusted beforehand such that the center thereof on the magneto-optical recording medium substantially coincides with the center of distribution of the magnetic fields generated by the first and second magnetic heads.

Figure 7:
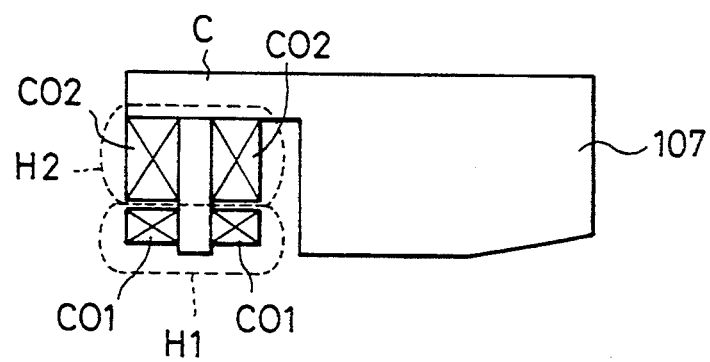
FIGS. 7 (A) and 7 (B) show alternative magnetic heads for use in the present invention.
Figure 7:
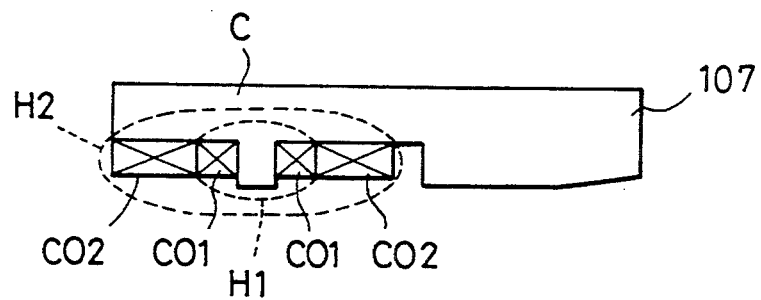

In addition to the composite magnetic head shown in FIG. 5 (A), composite magnetic heads shown in FIGS. 7 (A) and 7 (B) may also be incorporated in the magneto-optical recording apparatus according to the present invention.

As will be understood from the foregoing description, according to the present invention, there is provided a magneto-optical recording apparatus for recording an information signal on or for erasing an information signal from magneto-optical recording media by irradiating the magneto-optical recording medium with a beam of light while applying a magnetic field thereto. The magneto-optical recording apparatus includes, as a magnetic field application means, a first magnetic head capable of modulation of a generated magnetic field in accordance with an information signal and capable of generation of a constant magnetic field which is not associated with the information signal, and a second magnetic head capable of generation of a constant magnetic field which is not associated with the information signal. When an information signal is recorded or erased during the light modulation type recording, both the first and second magnetic heads are operated at the same time to apply constant magnetic fields generated in the same direction to the recording medium.

Hence, the magneto-optical recording apparatus according to the present invention can employ both the magneto-optical recording media for both the light modulation type recording and for the magnetic field modulation type recording, and which ensures overwriting without increasing the overall size of the apparatus. Furthermore, it is possible during the light modulation recording to obtain a magnetic field having an intensity required for recording an information signal without increasing the number of turns of the coil of the magnetic head or the amount of current supplied to the coil.

The magneto-optical recording apparatus according to the present invention includes a composite magnetic head capable of using magneto-optical disks for both light modulation type recording and magnetic field modulation type recording. The light modulation type recording is one which has been widely used, and the magnetic field modulation type recording assures overwriting of an information signal. Furthermore, a constant magnetic field is generated during the light modulation type recording by both the magnetic head for generating a modulated magnetic field and the magnetic head for generating a constant magnetic head. Consequently, a magnetic field having a sufficient intensity can be obtained without increasing the number of turns of the coil of the magnetic head or the amount of current supplied to the coil. These important features eliminate the problems related to unstable floating of the magnetic head caused by an increase in the weight thereof or a rise in the temperature of the magnetic head caused by an increase in the amount of generated heat.

What is claimed is:

1. A magneto-optical recording apparatus comprising:
    an optical head for irradiating a magneto-optical recording medium with a beam of light; and
    a magnetic field generating device for applying to the magneto-optical recording medium, based on a type of recording being performed, at least one of a modulated magnetic field and a constant magnetic field concurrently with the beam of light to record information on the recording medium, said magnetic field generating device comprising (i) a first magnetic head having a first coil, (ii) a second magnetic head having a second coil different from the first coil, said first and second magnetic heads being arranged as one unit, and (iii) a controller for receiving a signal indicating the type of recording being performed and for controlling said first and second magnetic heads in accordance with the received signal, said controller controlling said first magnetic head to generate a modulated magnetic field when magnetic field modulation-type recording is performed, and controlling said second magnetic head to generate a constant magnetic field, in one of a first direction and a second direction, at least when light modulation-type recording is performed.

2. A magneto-optical recording apparatus according to claim 1, further comprising moving means for moving the unit in a direction perpendicular to a surface of the magneto-optical recording medium.

3. A magneto-optical recording apparatus according to claim 1, wherein said first magnetic head generates the modulated magnetic field with a first intensity distribution and said second magnetic head generates the constant magnetic field with a second intensity distribution, the first and second intensity distributions substantially coinciding in an eccentric arrangement.

4. A magneto-optical recording apparatus according to claim 1, wherein said optical head generates a light spot having a center substantially coinciding with a center of the first and second intensity distributions of the magnetic fields generated by said first and second magnetic heads.

5. A magneto-optical recording apparatus according to claim 1, wherein said controller controls the first magnetic head to generate the modulated magnetic field and controls the second magnetic head to generate the constant magnetic field at the same time, when magnetic field modulation-type recording is performed, so that the constant magnetic field augments the modulated magnetic field.

6. A magneto-optical recording apparatus comprising:
    an optical head for irradiating a magneto-optical recording medium with a beam of light; and
    a magnetic field generating device for applying to the magneto-optical recording medium, based on a type of recording being performed, at least one of a modulated magnetic field and a constant magnetic field concurrently with the beam of light to record information on the recording medium, said magnetic field generating device comprising (i) a first magnetic head having a first coil, (ii) a second magnetic head having a second coil different from the first coil, said first and second magnetic heads being arranged as one unit, and (iii) a controller for receiving a signal indicating the type of recording being performed and for controlling said first and second magnetic heads in accordance with the received signal, said controller controlling said first magnetic head to generate a magnetic field modulated in accordance with an information signal when magnetic field modulation-type recording is performed, and controlling said second magnetic head to generate a constant magnetic field independent of the information signal, in one of a first direction and a second direction, at least when light modulation-type recording is performed.

7. A magneto-optical recording apparatus comprising:
    an optical head for irradiating a magneto-optical recording medium with a beam of light;
    a first magnetic field generating device having a first coil for applying a first magnetic field to the magneto-optical recording medium;

a second magnetic field generating device having a second coil different from the first coil for applying a second magnetic field to the magneto-optical recording medium; and a controller for receiving a signal indicating the type of recording being performed and for controlling said first and second magnetic field generating devices in accordance with the received signal, said controller controlling (i) said first magnetic field generating device to apply, concurrently with the light beam, (a) a modulated magnetic field when magnetic field modulation-type recording is performed and (b) a first constant magnetic field, in one of a first direction and a second direction, when light modulation-type recording is performed, and (ii) said second magnetic field generating device to apply, concurrently with the light beam, a second constant magnetic field, in one of a first direction and a second direction, which direction coincides with the direction of the first constant magnetic field, at least when light modulation-type recording is performed.

8. A magneto-optical recording apparatus according to claim 7, wherein said first and second coils are arranged as one unit.

9. A magneto-optical recording apparatus according to claim 7, further comprising means for moving said first and second coils in a direction perpendicular to a surface of the magneto-optical recording medium.

10. A magneto-optical recording apparatus according to claim 7, wherein said first coil generates the modulated magnetic field and the first constant magnetic field with a first intensity distribution and said second magnetic coil generates the second constant magnetic field with a second intensity distribution, the first and second intensity distributions substantially coinciding in an eccentric arrangement.

11. A magneto-optical recording apparatus according to claim 10, wherein said optical head generates a light spot having a center substantially coinciding with a center of the first and second intensity distributions of the magnetic fields generated by said first and second coils.

12. A magneto-optical recording apparatus according to claim 7, wherein said controller controls the first magnetic field generating device to apply the modulated magnetic field and controls the second magnetic field generating device to apply the second constant magnetic field at the same time, when magnetic modulation-type recording is performed, so that the second constant magnetic field augments the modulated magnetic field.

13. A magneto-optical recording apparatus comprising:

an optical head for irradiating a magneto-optical recording medium with a beam of light;

a first magnetic field generating device having a first coil for applying a first magnetic field to the magneto-optical recording medium;

a second magnetic field generating device having a second coil different from said first coil for applying a second magnetic field to the magneto-optical recording medium; and a controller for receiving a signal indicating the type of recording being performed and for controlling said first and second magnetic field generating devices in accordance with the received signal, said controller controlling (i) said first magnetic field generating device to apply, concurrently with the light beam, (a) a magnetic field modulated in accordance with an information signal when magnetic field modulation-type recording is performed and (b) a first constant magnetic field independent of the information signal, in one of a first direction and a second direction, when light modulation-type recording is performed, and (ii) said second magnetic field generating device to apply, concurrently with the light beam, a second constant magnetic field independent of the information signal, in one of a first direction and a second direction, which direction coincides with the direction of the first constant magnetic field, at least when light modulation-type recording is performed.

14. A magnetic head for applying a magnetic field to magneto-optical recording media to record information thereon, said magnetic head comprising:

a first magnetic head comprising a first coil having a structure for applying one of (i) a modulated magnetic field for modulated magnetic field-type recording and (ii) a first constant magnetic field for light modulation-type recording; and a second magnetic head, integrally arranged with said first magnetic head, comprising a second coil, different from said first coil, having a structure for applying a second constant magnetic field, in one of a first direction and a second direction, for light modulation-type recording.

15. A magnetic head for applying a magnetic field to magneto-optical recording media to record information thereon, said magnetic head comprising:

a first magnetic head comprising a first coil having a structure for applying one of (i) a modulated magnetic field for modulated magnetic field-type recording and (ii) a first constant magnetic field, in one of a first direction and a second direction, for light modulation-type recording; and a second magnetic head, integrally arranged with said first magnetic head, comprising a second coil, different from said first coil, having a structure for applying a second constant magnetic field, in one of a first direction and a second direction, which direction coincides with the direction of the first constant magnetic field, for light modulation-type recording.

16. A magnetic head according to claim 15, wherein said first and second magnetic coils are arranged as one unit.

17. A magneto-optical recording and erasing apparatus for recording an information signal on, and for erasing an information signal from, a magneto-optical recording medium by applying a magnetic field to the recording medium while irradiating the recording medium with a beam of light, said recording and erasing apparatus comprising:

irradiating means for irradiating the recording medium with a light beam;

a composite head comprising a first magnetic head having a first coil and a second magnetic head having a second coil different from said first coil; and magnetic field application means for controlling said composite head to apply a magnetic field to the recording medium concurrently with the light beam to perform at least one of recording information on and erasing information from the recording medium, said magnetic field application means comprising a controller for receiving a signal indicating a type of recording being performed and for controlling said composite head in accordance with the received signal, said controller controlling (i) said first magnetic head to generate a modulated magnetic field for performing magnetic field modulation-type recording and (ii) said second magnetic head to generate a constant magnetic field, in one of a first direction and a second direction, for performing light modulation-type recording.

18. A recording and erasing apparatus according to claim 17, wherein said magnetic field application means comprises means for causing said first coil to generate the modulated magnetic field in accordance with an information signal.

19. A recording and erasing apparatus according to claim 18, wherein said magnetic field application means comprises means for causing said second coil to generate the constant magnetic field independent of an information signal.

20. A recording and erasing apparatus according to claim 17, wherein said magnetic field application means comprises means for causing said second coil to generate the constant magnetic field independent of an information signal.

21. A magneto-optical recording apparatus comprising:
an optical head for irradiating a magneto-optical recording medium with a beam of light; and
a magnetic field generating device for applying to the magneto-optical recording medium, based on a type of recording being performed, at least one of a modulated magnetic field and a constant magnetic field concurrently with the beam of light to record information on the recording medium, said magnetic field generating device comprising (i) a first magnetic head having a first coil, (ii) a second magnetic head having a second coil different from said first coil, said first and second magnetic heads being disposed on a side of the recording medium which is opposite to another side on which said optical head is disposed, and (iii) a controller for receiving a signal indicating the type of recording being performed and for controlling said first and second magnetic heads in accordance with the received signal, said controller controlling said first magnetic head to generate a modulated magnetic field when magnetic field modulation-type recording is performed and controlling said second magnetic head to generate a constant magnetic field, in one of a first direction and a second direction, when light modulation-type recording is performed.

22. A magneto-optical recording apparatus according to claim 21, further comprising moving means for moving said magnetic heads in a direction perpendicular to a surface of the magneto-optical recording medium.

23. A magneto-optical recording apparatus according to claim 21, wherein said first coil generates the modulated magnetic field with a first intensity distribution and said second magnetic coil generates the constant magnetic field with a second intensity distribution, the first and second intensity distributions substantially coinciding in an eccentric arrangement.

24. A magneto-optical recording apparatus according to claim 23, wherein said optical head generates a light spot having a center substantially coinciding with a center of the first and second intensity distributions of the magnetic fields generated by said first and second magnetic heads.

25. A magneto-optical recording apparatus according to claim 21, wherein said controller controls said first magnetic head to generate the modulated magnetic field and controls said second magnetic head to generate the constant magnetic field at the same time, when magnetic field modulation-type recording is performed, so that the constant magnetic field augments the modulated magnetic field.

26. A magneto-optical recording apparatus comprising:
an optical head for irradiating a magneto-optical recording medium with a beam of light; and
a magnetic field generating device for applying to the magneto-optical recording medium based on a type of recording being performed, at least one of a modulated magnetic field and a constant magnetic field concurrently with the beam of light to record information on the recording medium, said magnetic field generating device comprising (i) a first magnetic head having a first coil, (ii) a second magnetic head having a second coil different from said first coil, said first and second magnetic heads being disposed on a side of the recording medium which is opposite to another side on which said optical head is disposed, and (iii) a controller for receiving a signal indicating the type of recording being performed and for controlling said first and second magnetic heads in accordance with the received signal, said controller controlling said first magnetic head to generate a modulated magnetic field in accordance with an information signal when magnetic field modulation-type recording is performed and controlling said second magnetic head to generate a constant magnetic field independent of the information signal, in one of a first direction and a second direction, when light modulation-type recording is performed.

27. A magneto-optical recording apparatus comprising:
an optical head for irradiating a magneto-optical recording medium with a beam of light;
a first magnetic field generating device having a first coil for applying a first magnetic field to the magneto-optical recording medium;
a second magnetic field generating device having a second coil different from said first coil for applying a second magnetic field to the magneto-optical recording medium; and
a controller for receiving a signal indicating the type of recording being performed and for controlling said first and second magnetic field generating devices in accordance with the received signal, said controller controlling (i) said first magnetic field generating device to apply, concurrently with the light beam, a modulated magnetic field when magnetic field modulation-type recording is performed and (ii) said second magnetic field generating device to apply, concurrently with the light beam, a constant magnetic field, in one of a first direction and a second direction, when light modulation-type recording is performed.

28. A magneto-optical recording apparatus according to claim 27, wherein said first and second magnetic coils are arranged as one unit.

29. A magneto-optical recording apparatus according to claim 27, further comprising means for moving said first and second magnetic coils in a direction perpendicular to a surface of the magneto-optical recording medium.

30. A magneto-optical recording apparatus according to claim 27, wherein said first coil generates the modulated magnetic field with a first intensity distribution and said second magnetic coil generates the constant magnetic field with a second intensity distribution, the first and second intensity distributions substantially coinciding in an eccentric arrangement.

31. A magneto-optical recording apparatus according to claim 30, wherein said optical head generates a light spot having a center substantially coinciding with a center of the first and second intensity distributions of the magnetic fields generated by said first and second magnetic heads.

32. A magneto-optical recording apparatus according to claim 27, wherein said controller controls said first magnetic field generating device to apply the modulated magnetic field and controls said second magnetic field generating device to apply the constant magnetic field at the same time, when magnetic field modulation-type recording is performed, so that the constant magnetic field augments the modulated magnetic field.

33. A magneto-optical recording apparatus comprising:
an optical head for irradiating a magneto-optical recording medium with a beam of light;
a first magnetic field generating device having a first coil for applying a first magnetic field to the magneto-optical recording medium;
a second magnetic field generating device having a second coil different from said first coil for applying a second magnetic field to the magneto-optical recording medium; and
a controller for receiving a signal indicating the type of recording being performed and for controlling said first and second magnetic field generating devices in accordance with the received signal, said controller controlling (i) said first magnetic field generating device to apply, concurrently with the light beam, a magnetic field modulated in accordance with an information signal when magnetic field modulation-type recording is performed and (ii) said second magnetic field generating device to apply, concurrently with the light beam, a constant magnetic field independent of the information signal, in one of a first direction and a second direction, when light modulation-type recording is performed.

34. A magnetic head for applying a magnetic field to magneto-optical recording media to record information thereon, said magnetic head comprising:
a first magnetic head comprising a first coil having a structure for applying a modulated magnetic field for magnetic field modulation-type recording; and
a second magnetic head comprising a second coil, different from said first coil, having a structure for applying a constant magnetic field, in one of a first direction and a second direction, for light modulation-type recording, said first and second magnetic heads being arranged to be disposed on a side of each recording medium that is opposite to a side on which an optical head is disposed.

35. A magneto-optical recording apparatus comprising:
an optical head for irradiating a magneto-optical recording medium with a beam of light; and
a magnetic field generating device for applying to the magneto-optical recording medium, based on a type of recording being performed, at least one of a modulated magnetic field and a constant magnetic field concurrently with the beam of light to record information on the recording medium, said magnetic field generating device comprising (i) a first magnetic head having a first coil, (ii) a second magnetic head having a second coil larger than the first coil, and (iii) a controller for controlling said first magnetic head to generate a modulated magnetic field when magnetic field modulation-type recording is performed, and controlling said second magnetic head to generate a constant magnetic field, in one of a first direction and a second direction, at least when light modulation-type recording is performed.

36. A magneto-optical recording apparatus according to claim 35, further comprising moving means for moving said magnetic field generating device in a direction perpendicular to a surface of the magneto-optical recording medium.

37. A magneto-optical recording apparatus according to claim 35, wherein said first magnetic head generates the modulated magnetic field with a first intensity distribution and said second magnetic head generates the constant magnetic field with a second intensity distribution, the first and second intensity distributions substantially coinciding in an eccentric arrangement.

38. A magneto-optical recording apparatus according to claim 37, wherein said optical head generates a light spot having a center substantially coinciding with a center of the first and second intensity distributions of the magnetic fields generated by said first and second magnetic heads.

39. A magnetic head for applying a magnetic field to magneto-optical recording media to record information thereon, said magnetic head comprising:
a first magnetic head comprising a first coil having a structure for applying a modulated magnetic field for modulated magnetic field-type recording; and
a second magnetic head, comprising a second coil, larger than said first coil, having a structure for applying a second constant magnetic field, in one of a first direction and a second direction, for light modulation-type recording.

40. A magnetic head for applying a magnetic field to magneto-optical recording media to record information thereon, said magnetic head comprising:
a first magnetic head comprising a first coil having a structure for applying a modulated magnetic field for magnetic field modulation-type recording; and
a second magnetic head, comprising a second coil, larger than said first coil, having a structure for applying a constant magnetic field, in one of a first direction and a second direction, for light modulation-type recording, said first and second magnetic heads being arranged to be disposed on a side of each recording medium that is opposite to a side on which an optical head is disposed.

41. A magneto-optical recording apparatus comprising:
an optical head for irradiating a magneto-optical recording medium with a beam of light; and
a magnetic field generating device for applying to the magneto-optical recording medium, based on a type of recording being performed, at least one of a modulated magnetic field and a constant magnetic field concurrently with the beam of light to record information on the recording medium, said magnetic field generating device comprising (i) a first magnetic head having a first coil, (ii) a second magnetic head having a second coil different from the first coil, said first and second magnetic heads being arranged as one unit, and (iii) a controller for moving said unit in a direction perpendicular to a surface of the magneto-optical recording medium, said controller controlling said unit to lower to a surface of the magneto-optical recording medium when magnetic field modulation-type recording is performed, and controlling said unit to raise to a surface of the magneto-optical recording medium when light modulation-type recording is performed.

42. A magneto-optical recording apparatus according to claim 41, wherein said first magnetic head generates the modulated magnetic field with a first intensity distribution and said second magnetic head generates the constant magnetic field with a second intensity distribution, the first and second intensity distributions substantially coinciding in an eccentric arrangement.

43. A magneto-optical recording apparatus according to claim 42, wherein said optical head generates a light spot having a center substantially coinciding with a center of the first and second intensity distributions of the magnetic fields generated by said first and second magnetic heads.

44. A magnetic head for applying a magnetic field to magneto-optical recording media to record information thereon, said magnetic head comprising:
 a first magnetic head comprising a first coil having a structure for applying a modulated magnetic field for modulated magnetic field-type recording; and
 a second magnetic head, integrally arranged with said first magnetic head, comprising a second coil, larger than said first coil, having a structure for applying a constant magnetic field, in one of a first direction and a second direction, for light modulation-type recording.

* * * * *

UNITED STATES PATENT AND TRADEMARK OFFICE
CERTIFICATE OF CORRECTION

PATENT NO. : 5,434,831

DATED : July 18, 1995

INVENTOR(S) : KAZUYOSHI ISHII, ET AL.

It is certified that error appears in the above-indentified patent and that said Letters Patent is hereby corrected as shown below:

COLUMN 2:

Line 9, "for" should read --For--.

COLUMN 3:

Line 12, "new a" should read --a new--.

COLUMN 4:

Line 51, "provide" should read --provides--.

COLUMN 5:

Line 15, "shows" should read --show--.

UNITED STATES PATENT AND TRADEMARK OFFICE
CERTIFICATE OF CORRECTION

PATENT NO. : 5,434,831
DATED : July 18, 1995
INVENTOR(S) : KAZUYOSHI ISHII, ET AL.

It is certified that error appears in the above-indentified patent and that said Letters Patent is hereby corrected as shown below:

<u>COLUMN 12</u>:

Line 22, "claim 1," should read --claim 3,--.

<u>COLUMN 16</u>:

Line 17, "medium" should read --medium,--.

Signed and Sealed this

Thirty-first Day of October 1995

Attest:

BRUCE LEHMAN

Attesting Officer      Commissioner of Patents and Trademarks